OR 3,870,396

United States Patent

Racki et al.

[11] 3,870,396

[45] Mar. 11, 1975

[54] OPTICAL COUPLER

[75] Inventors: Jerome G. Racki; Frank L. Thiel, both of Painted Post, N.Y.

[73] Assignee: Corning Glass Works, Corning, N.Y.

[22] Filed: July 5, 1973

[21] Appl. No.: 376,579

[52] U.S. Cl. .......................... 350/96 WG, 350/96 C

[51] Int. Cl. ............................................ G02b 5/14

[58] Field of Search ........... 350/96 R, 96 B, 96 WG, 350/169–174, 285

[56] References Cited

UNITED STATES PATENTS

| | | | |
|---|---|---|---|
| 3,156,825 | 11/1964 | Lines | 350/285 X |
| 3,444,478 | 5/1969 | Gudmundsen et al. | 350/285 X |
| 3,716,804 | 2/1973 | Groschwitz | 350/96 WG UX |

*Primary Examiner*—John K. Corbin
*Attorney, Agent, or Firm*—William J. Simmons, Jr.; Clarence R. Patty, Jr.

[57] ABSTRACT

A coupler to be disposed between two sections of optical signal transmission line for extracting a fraction of the energy transmitted thereby and for coupling to the transmission line substantially all of an input optical signal. An optical signal from one section of transmission line partially reflects from a first optical interface, the reflected portion of the signal being extracted from the transmission line and the refracted portion being coupled by a tapered transparent rod to the remaining section of transmission line. An input optical signal is totally reflected from a second optical interface and is also coupled by the tapered rod into the remaining section of transmission line.

18 Claims, 7 Drawing Figures

OPTICAL COUPLER

CROSS-REFERENCES TO RELATED APPLICATIONS

This application is related to U.S. Application Ser. No. 376,578 entitled "Variable Ratio Light Coupler" filed on even date herewith and assigned to the assignee of the present application.

BACKGROUND OF THE INVENTION

The continually increasing amount of traffic that communications systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accomodate future increases in traffic. These systems are referred to as optical communications systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media required in the transmission of frequencies around $10^{15}$ Hz are hereinafter referred to as optical signal transmission lines which may consist of a single optical waveguide or a bundle thereof. Optical waveguides normally consist of an optical fiber having a transparent core surrounded by a layer of transparent cladding material having a refractive index which is lower than that of the core. Although the theory of optical waveguides has been known for some time, practical optical waveguides that do not absorb an excessive amount of transmitted light have been developed only recently. U.S. Pat. No. 3,659,915 discloses a low loss optical waveguide comprising a cladding layer of fused silica and a core of fused silica doped with one or more materials that selectively increase the index of refraction of the core above that of the cladding.

To establish between a plurality of stations an optical communication network, i.e., one employing optical signal transmission lines, a variety of interconnection schemes may be utilized. Each station can be "hard wired" to every other station, but when many stations must be interconnected, the excessive amount of optical signal transmission line required causes this method to be undesirable due to both the cost of the transmission line and the space consumed thereby. The stations may be interconnected by a loop or line data bus which drastically reduces the required amount of optical signal transmission line.

A loop data bus can be used, for example, to interconnect a plurality of stations, one of which is generally a central processing unit (CPU). The type of transmission-path has no end, and data, in principle, could circulate around the path many times. In practice, attenuation is large enough that the data is not detectable after one circuit of the loop. Transmission in the loop can be unidirectional, i.e., each station transmits in one direction only, or it may be bidirectional, depending upon the type of coupler used at each station.

Each station requires a coupler for extracting from the transmission line a fraction of the optical signal propagating therein. In a given network the fraction of the propagating optical signal to be extracted by a coupler depends upon the number of stations in the network. The fraction of energy extracted by each coupler decreases as the number of stations increases, thereby permitting a portion of an optical signal propagating through the transmission line to be detected by each station. Each coupler should also be capable of injecting onto the transmission line an optical signal of sufficient strength that it is detectable at each of the remaining stations. If the number of stations connected to the transmission line is increased or decreased, the extraction ratio of all the previously used couplers should be changed. Unless the extraction ratio of a coupler is variable, it must be replaced by another having the proper extraction ratio.

In said related application Ser. No. 376,578 there is disclosed a coupler for extracting a variable amount of an optical signal from a transmission line. Since this coupler must use the same or a similar light reflecting interface for both the extraction of an optical signal from a transmission line and the injection of an input optical signal into a transmission line, only a fraction of the input optical signal can be coupled from a station into the transmission line.

SUMMARY OF THE INVENTION

It is an object of the present invention to provide an optical signal coupler that is capable of extracting a variable fraction of an optical signal from an optical signal transmission line and injecting substantially all of an input optical signal onto the transmission line.

Briefly, the present invention relates to a light coupler for use in an optical communication system including first and second sections of optical signal transmission line. The coupler comprises first and second transparent members, each having first and second opposed, non-parallel planar surfaces and a third planar surface intersecting the second planer surface and making an acute angle therewith. At least a portion of the second surface of the second member is parallel to and slightly spaced from the second surface of the first member. A first sheet of transparent material having a refractive index lower than those of the first and second members is disposed between the first and second members. The transparent sheet is disposed adjacent to at least a portion of the second surface of the first member and is disposed adjacent to less than the entire second surface of the second member. A layer of transparent material is disposed adjacent to that portion of the second surface of the second member that is not adjacent to the first sheet, the refractive index of the layer being lower than that of the first sheet. First coupling means is disposed adjacent to the first surface of the first member for coupling light from the first section of transmission line into the first member, the longitudinal axis of the first section of transmission line making an angle other than 90° with the second surface of the first member. Output means are provided for receiving that light which reflects from the interface between the first member and the sheet. Second coupling means is disposed adjacent to the third surface of the first member for coupling optical signals between the first member and the output means. An input optical signal, which is provided by input means, is coupled by third coupling means into the third surface of the second member at such an angle that the input optical signal is substantially totally reflected from the interface between the layer and the second member. Fourth coupling means is disposed adjacent to the first surface of the second member for combining the input optical signal and the unreflected portion of the optical signal from the first member and for coupling the resultant optical signal into the second section of transmission line. Means are provided for replacing the first sheet with a second sheet having a different refractive index so that the fraction of the optical signal coupled to the output means can be changed.

As used herein the word "transparent" indicates transparency to those wavelengths of light that are transmitted by the optical signal transmission lines in which the coupler of the present invention is connected.

DESCRIPTION OF THE PREFERRED EMBODIMENTS

Figure 1:
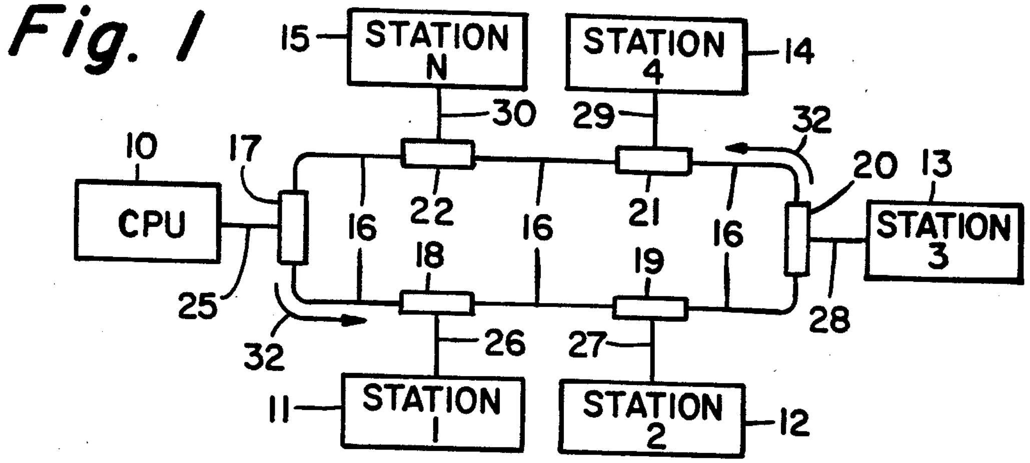
FIG. 1 is a schematic illustration in block diagram form of a loop data bus.

FIG. 1 is a schematic illustration in block diagram form of a loop data bus wherein a central processing unit 10 and a plurality of stations 11 through 15 are interconnected by an optical signal transmission line 16. Couplers 17 through 22, which are disposed between sections of transmission line 16, are utilized for injecting optical signals into and extracting optical signals from the transmission line. Lines 25 through 30 are indicative of one or more auxiliary transmissions lines which interconnect each of the couplers to its associated station. In communication systems of the type illustrated in FIG. 1 optical signals generally travel in one direction as indicated by arrows 32.

Figure 2:
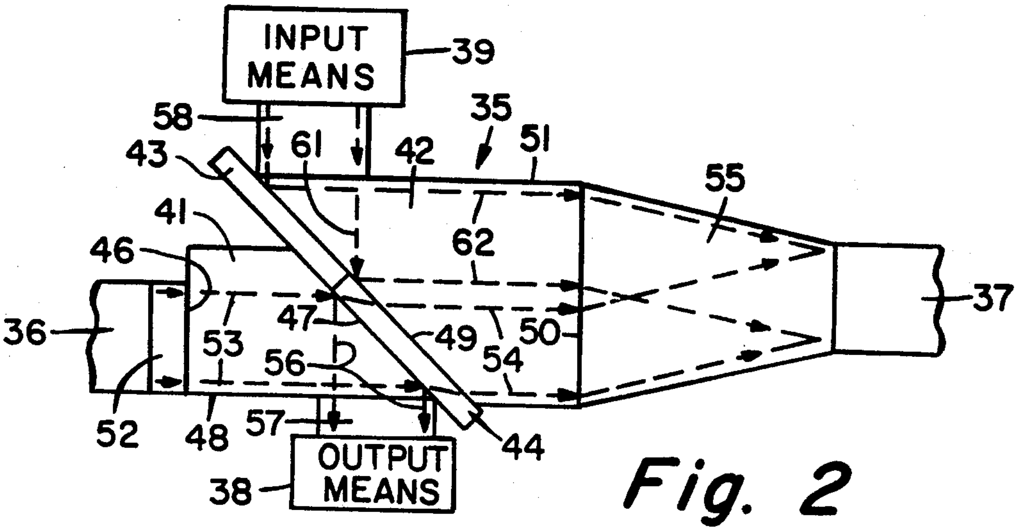
FIG. 2 is a schematic illustration of a coupler constructed in accordance with the present invention.

FIG. 2 is a schematic illustration of a coupler constructed in accordance with the present invention. Coupler 35 is disposed between two sections 36 and 37 of optical signal transmission line for coupling a fraction of the optical signal propagating in transmission line 36 to output means 38 and for coupling an input optical signal from input means 39 into section 37 of transmission line. That light from section 36 of transmission line which is not extracted and coupled to output means 38 is also coupled to section 37 of transmission line.

Coupler 35 comprises first and second transparent members 41 and 42 separated by layers 43 and 44 of transparent material. Transparent member 41 has a first planar surface 46 which is adapted to receive an optical signal from section 36 of transmission line and a second planar surface 47 which is disposed opposite surface 46. Surfaces 46 and 47 are preferably non-parallel, and surface 46 is preferably perpendicular to the axis of section 36 of transmission line. A third planar surface 48 intersects surfaces 46 and 47 and makes an acute angle with surface 47. Member 42 has first and second opposed, non-parallel planar surfaces 49 and 50, surface 49 being parallel to surface 47. A third planar surface 51 intersects surfaces 49 and 50 and makes an acute angle with surface 49.

An optical signal radiating from section 36 of transmission line is coupled to member 41 by coupling means 52, and propagates through member 41 as illustrated by dashed lines 53. Layer 43 is disposed adjacent to at least a portion of surface 47 and forms a partially reflecting interface to optical signal 53. That portion of optical signal 53 which passes through layer 44 propagates through member 42, as illustrated by dashed lines 54 and is coupled to section 37 of transmission line by tapered transparent rod 55. As illustrated by dashed lines 56, a portion of optical signal 53 reflects from the interface between member 41 and layer 44 and is coupled to output means 38 by coupling means 57.

Layer 44 is disposed adjacent to less than all of surface 49, the remaining portion of surface 49 being disposed adjacent to layer 43. An input optical signal provided by input means 39 is coupled to member 42 by means 58 and propagates in member 42 as illustrated by dashed lines 61. Optical signal 61 reflects from the interface between member 42 and layer 43 and propagates through member 42 as indicated by dashed lines 62 toward planar surface 50 where it is coupled by tapered rod 55 to section 37 of transmission line.

Output means 38 may consist of a light detector disposed in light receiving relationship with respect to member 41, or it may consist of an auxiliary optical signal transmission line for propagating optical signals extracted from member 41 to a remote detector. Input means 39 may consist of a light source so disposed with respect to member 42 that optical signals radiating therefrom impinges upon surface 51, or it may consist of an auxiliary transmission line for propagating optical signals from a remote light source or station to surface 51. Coupling means 52, 57 and 58 are utilized for efficiently propagating optical signals between various light transmitting elements of FIG. 2 and may consist of such transparent media as index matching fluid, light transmitting rods or fibers and combinations thereof.

The refractive index $n_1$ of member 41 is preferably equal to that of member 42, and the refractive index $n_2$ of layer 44 is less than $n_1$. The refractive index $n_3$ of layer 43 is less than $n_2$. The refractive indices $n_1$ and $n_2$ and the angle between surface 47 and the axis of section 36 of transmission line are selected to cause a predetermined fraction r of the optical signal transmitted by section 36 of transmission line to be extracted by coupler 35 and propagated to output means 38. The fraction r can be easily varied by removing layer 44 and replacing it by a layer of another material having a refractive index different from that of the original layer. The refractive index of layer 43 should be sufficiently lower than that of member 42 that a substantial amount of the input optical signal from input means 39 is reflected from the interface between member 42 and layer 43, and the refractive index difference is preferably great enough that all of that input light reflects from that interface by the process of total internal reflection.

Figure 3:
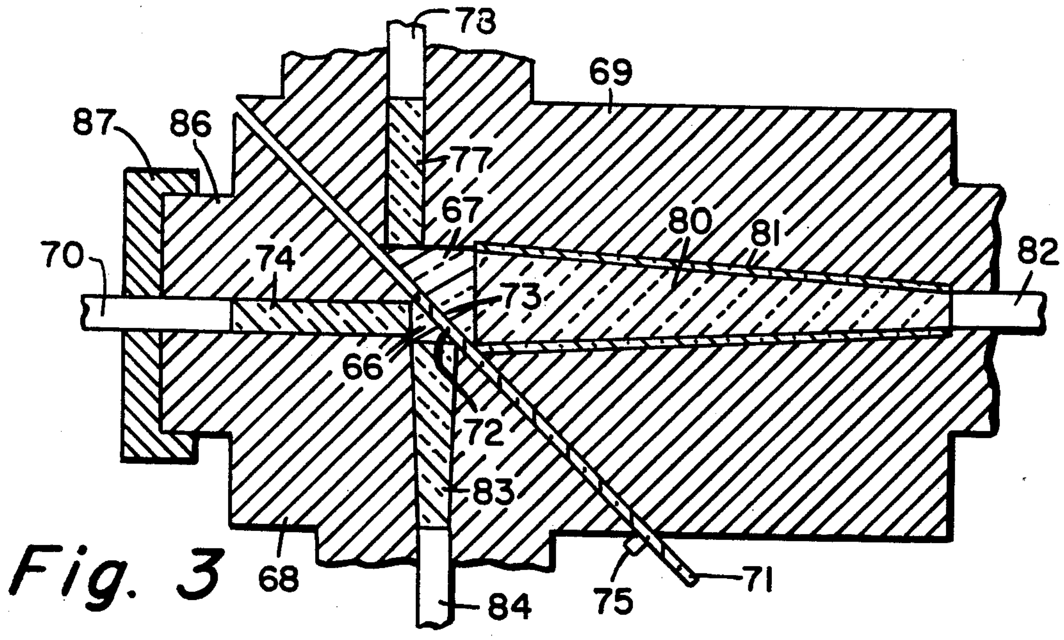
FIG. 3 is a cross-sectional view of a preferred embodiment of the present invention.
Figure 4:
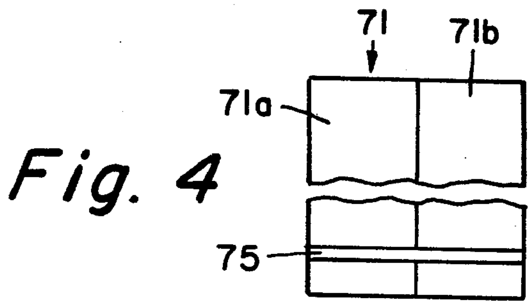
FIG. 4 is a fragmentary view of a transparent sheet for use in the embodiment of FIG. 3.

In the preferred embodiment illustrated in FIG. 3 the previously described transparent members consist of 45° right prisms 66 and 67 which are disposed in support sections 68 and 69, respectively. The prisms and support sections are slightly spaced, and a thin glass sheet 71 is slidably disposed therebetween, sheet 71 extending between the large area faces 72 and 73 of prisms 66 and 67 respectively. That portion of face 73 which extends beyond face 72 is exposed to air in the embodiment illustrated, although some other material having a refractive index lower than that of sheet 71 could be utilized. As previously indicated, the refractive index of sheet 71 must be lower than that of prisms 66 and 67. A mechanical stop 75 is affixed to sheet 71 to prevent it from sliding beyond the indicated position. Glass sheet 71 may consist of two or more sheets of different refractive index disposed in side-by-side relationship. A sheet 71 having sections 71a and 71b is illustrated in FIG. 4. The desired refractive index can be obtained by sliding sheet 71 until the proper section thereof is disposed between prisms 66 and 67. Alternatively, sheet 71 may be completely removed and replaced by one having the proper refractive index to achieve the desired coupling ratio.

A glass rod 74 couples optical signals from a first section 76 of transmission line into prism 66, and glass rod 77 couples optical signals from section 78 of transmission line into prisms 67. A tapered glass rod 80 mixes or combines the optical signals from transmission lines 70 and 78 and couples the combined optical signals to transmission line 82. As illustrated in FIG. 3 rod 80 may be provided with a layer 81 of transparent cladding material having a refractive index lower than that of rod 80. A tapered glass rod 83 couples the extracted light signal from prism 66 to an auxiliary optical signal transmission line 84. Rod 83 could be cylindrical rather than tapered but a tapered rod is preferred since light diverges slightly as it radiates from the transmission line and propagates through the prism 66, and the larger endface afforded by a tapered rod is capable of accepting a greater amount of the diverging light. The size of the smaller endfaces of rods 80 and 83 are substantially equal to the diameter of transmission line sections 82 and 84, respectively. Rods 74, 77 and 83 could be provided with a cladding layer similar to layer 81, but for the sake of simplicity, unclad rods are illustrated.

Support sections 68 and 69 may each be provided with extended portions which are adapted to receive optical signal transmission lines. For the sake of simplicity, only extended portion 86 is completely illustrated. Member 87, which is affixed to transmission line 70, is threaded to or otherwise affixed to extended portion 86 in such a manner that the transmission line 70 is forced into engagement with the end of glass rod 74.

The refractive indices of glass rods 74, 77, 80 and 83 and prisms 66 and 67 are preferably identical. All optical interfaces such as those between the transmission lines and the glass rods, between the glass rods and the prisms and between the prisms and the glass sheet are preferably provided with an index matching fluid for the purpose of reducing Fresnel reflections.

Figure 5:
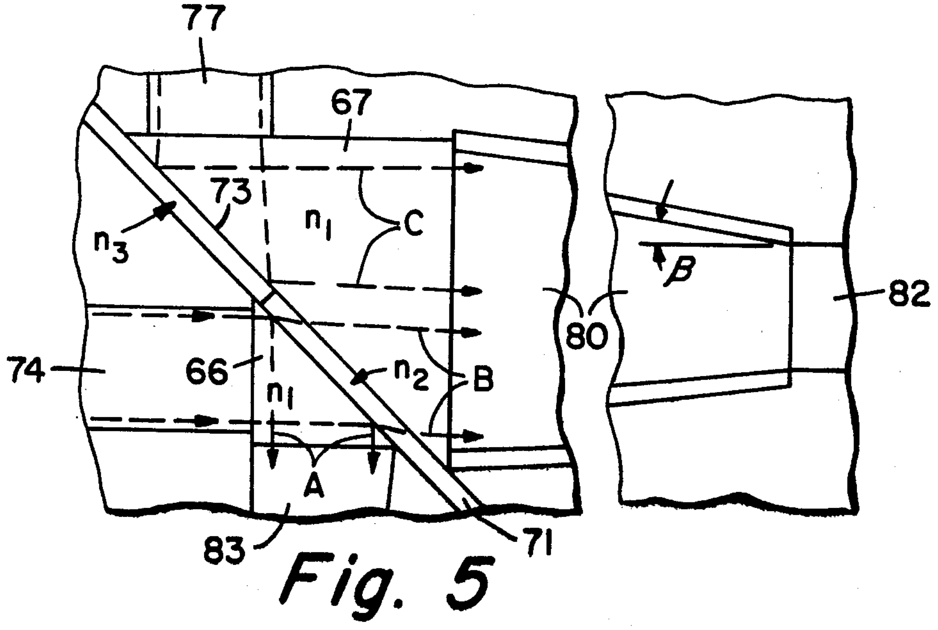
FIG. 5 is a diagram which illustrates the operation of the light-reflecting surfaces of FIG. 3.

The operation of the coupler illustrated in FIG. 3 will be described in connection with the diagram illustrated in FIG. 5. An input optical signal from rod 74 enters prism 66 and a fraction r thereof is reflected toward glass rod 83 as indicated by dashed lines A. It can be shown from Fresnel's laws of reflection that $$r = 1/2\ [(1 - n\alpha/1 + n\alpha)^2 + (n - \alpha/n + \alpha)^2] \qquad (1)$$

where $n$ equals $n_1/n_2$ and $\alpha$ equals cos $\phi$/cos $\phi'$. By changing the material which separates prisms 66 and 67, $n_2$ can be varied. Thus, $n$ and $\alpha$, and hence, the fraction $r$ of light extracted by the coupler can be varied. Couplers having different light extraction fractions can therefore be manufactured from identically formed parts.

That portion of the optical signal which does not reflect from the interface between prism 66 and layer 71 is refracted into layer 71. Prism 67 refracts the non-reflected light again so that this light is returned to its original direction of propagation, as indicated by dashed lines B, if the refractive index of prism 66 is equal to that of prism 67.

The refractive index $n_3$ should be low enough compared with that of prism 67 that optical signals entering prism 67 from rod 77 are totally reflected. Since air is transparent and has a suitably low refractive index, it is utilized in the preferred embodiment. Input optical signals from rod 77 enter prism 67 and reflect by the process of total internal reflection from that portion of surface 73 which forms an air-glass interface. As indicated by dashed lines C these reflected optical signals are propagated into core 80 along with those indicated by dashed lines B. Core 80 functions to mix or combine the light received from the two aforementioned sources and initiate the propagation of a combined optical signal in section 82 of transmission line. The taper angle B of core 80 is preferably no greater than 1/2 $\theta_c$ where $\theta_c$ is the acceptance half angle of the optical waveguides of the transmission lines to which the present coupler is connected, as measured in core 80. The acceptance half angle of the transmission lines is the same as that of the optical waveguides therein.

To provide a coupler having a wide range of extraction ratios the refractive index $n_1$ of prisms 66 and 67 should be relatively high. If the material from which layer 71 is formed is to be a solid sheet, the value of $n_2$ can range from about 1.39 (e.g., $MgF_2$) to about 1.77 (e.g., flint glass), with most of the range between 1.45 and 1.77 being covered by various glasses. If prisms 66 and 67 are constructed from a dense flint glass having a refractive index of 1.95, the aforementioned range of values of $n_2$ will provide extraction ratios from more than 40% down to about 0.5%.

As a specific example, consider a coupler of the type illustrated in FIG. 3 constructed from prisms having a refractive index of 1.95 separated by a glass sheet having a refractive index of 1.50. In this situation n is equal to $n_1/n_2$ which equals 1.40. The ratio $\phi'$/sin $\phi$ is also equal to $n_1/n_2$. In the embodiment illustrated wherein 45° right prisms are utilized, the angle $\phi$ is 45°. Sin $\phi$ is therefore 0.70711, and the angle $\phi'$ can be found to be 66.815°. Hence, $\alpha$, which is equal to the ratio cos $\phi$/cos $\phi'$, can be calculated to be 1.796, and thus, the extraction ratio $r$ can be calculated from equation (1) to be 12%.

Various modifications and additions may be made to the above-described embodiments without departing from the scope of the invention disclosed. For example, although 45° right prisms are employed in the preferred embodiment, the present invention also encompasses couplers having light reflecting interfaces that makes angles other than 45° with respect to the direction of propagation of the input light. Furthermore, the indices of refraction of the two prisms need not be identical, but it is to be noted that in such an embodiment the axes of the input and output light coupling rods and transmission lines would not be parallel and that such an embodiment would probably be more difficult to fabricate. Also, the prisms and one or more of the light conducting rods associated therewith could be of unitary construction, thereby eliminating one or more light-reflecting interfaces.

Figure 6:
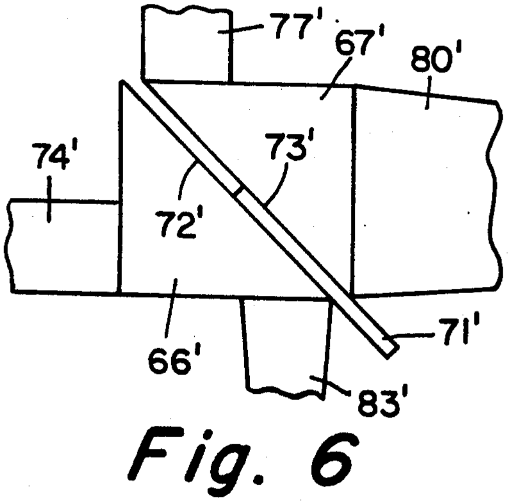
FIGS. 6 and 7 are schematic illustrations of modifications of the preferred embodiment.
Figure 7:
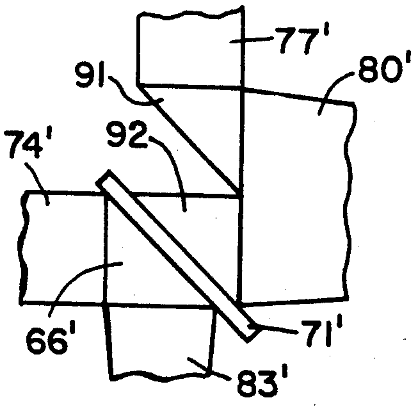

Two modifications of the preferred embodiment are schematically illustrated in FIGS. 6 and 7 wherein elements similar to those of FIG. 3 are represented by primed reference numerals.

The relative sizes of the prisms 66 and 67 need not be as illustrated in FIG. 3. For example, the prisms could be of equal size as illustrated in FIG. 6, provided that sheet 71' extends only a sufficient distance between faces 72' and 73' to provide a partially reflecting interface for optical signals emanating from rod 74'. The remainder of face 73' must be disposed adjacent to a low refractive index material such as air so that optical signals emanating from rod 77' are totally reflected.

As illustrated in FIG. 7, prism 67 can be replaced by two smaller prisms 91 and 92. In this embodiment the path of optical signals propagating between rods 77' and 80' is shorter than the path between rods 77 and 80 of FIG. 3, but the embodiment illustrated in FIG. 3 is more easily constructed.

We claim:

1. A light coupler for use in an optical communication system including first and second sections of optical signal transmission line, said coupler comprising a first transparent member having first and second opposed, nonparallel planar surfaces and a third planar surface intersecting said second planar surface and making an acute angle therewith, a second transparent member having first and second opposed, nonparallel planar surfaces and a third planar surface intersecting said second surface and making an acute angle therewith, at least a portion of said second surface of said second member being parallel to and slightly spaced from said second surface of said first member, a first sheet of transparent material disposed between said first and second members, the refractive index of said sheet being less than those of said members, said sheet being disposed adjacent to at least a portion of said second surface of said first member and being disposed adjacent to less than the entire second surface of said second member, a layer of transparent material disposed adjacent to that portion of said second surface of said second member that is not adjacent to said first sheet, the refractive index of said layer being lower than that of said first sheet, first coupling means disposed adjacent to said first surface of said first member for coupling an optical signal from said first section of optical signal transmission line into said first member, the longitudinal axis of said first section of transmission line making an angle other than 90° with said second surface of said first member, output means for receiving that light which reflects from the interface between said first member and said first sheet, second coupling means disposed adjacent to said third surface of said first member for coupling light between said first member and said output means, input means for providing an input optical signal, third coupling means for coupling said input optical signal into said third surface of said second member at such an angle that said input optical signal is substantially totally reflected from the interface between said layer and said second member, fourth coupling means disposed adjacent to said first surface of said second member for combining said input optical signal and the unreflected portion of the optical signal from said first member and coupling the resultant optical signal into said second section of optical signal transmission line, and means for replacing said first sheet with a second sheet having a refractive index which is different from said first sheet and which is less than the refractive indices of said members.

2. A light coupler in accordance with claim 1 wherein said output means comprises an auxiliary optical signal transmission line having one end disposed adjacent to said second coupling means.

3. A light coupler in accordance with claim 1 wherein said sheet is slidably disposed between said first and second members.

4. A light coupler in accordance with claim 3 wherein said sheet comprises a plurality of sections each having a different refractive index.

5. A light coupler in accordance with claim 1 wherein the refractive index of said first member is equal to the refractive index of said second member.

6. A light coupler in accordance with claim 1 wherein said first and second members are first and second right prisms, respectively, said second planar surfaces of said first and second members constituting the large area faces of said prisms.

7. A light coupler in accordance with claim 6 wherein said prisms are 45° right prisms.

8. A light coupler in accordance with claim 7 wherein said first planar surfaces of said first and second members are perpendicular to the axes of said first and second transmission lines, respectively.

9. A light coupler in accordance with claim 1 wherein said layer is air.

10. A light coupler comprising first and second 45° right prisms of transparent material, each of said prisms having first and third planar surfaces of substantially equal area and a second planar surface of greater area than said first and third surfaces, at least a portion of the second surface of said second prism being parallel to and slightly spaced from the second surface of said first prism, the first surfaces of said prisms being substantially parallel, a first sheet of transparent material disposed between said first and second prisms, the refractive index of said sheet being less than those of said first and second prisms, said sheet being disposed adjacent to at least a portion of the second surface of said first prism and being disposed adjacent to less than the entire second surface of said second prism, means for replacing said first sheet with a second sheet having a refractive index which is different from said first sheet and which is less than the refractive indices of said prisms, a layer of transparent material disposed adjacent to that portion of said second surface of said second prism that is not adjacent to said first sheet, the refractive index of said layer being lower than that of said first sheet, first, second and third elongated rods of transparent material, each of said rods terminating in first and second planar endfaces that are substantially perpendicular to the longitudinal axis thereof the first endface of said first rod being disposed adjacent to and substantially parallel to the first surface of said first prism, the first endface of said second rod being disposed adjacent to and substantially parallel to the third surface of said first prism, the first endface of said third rod being disposed adjacent to and substantially parallel to the third surface of said second prism, and a tapered rod of transparent material having large and small planar endfaces that are substantially perpendicular to the axis thereof, said large endface being disposed adjacent to said first surface of said second prism for gathering and combining optical signals emanating from said second prism.

11. A light coupler in accordance with claim 10 wherein said sheet is slidably disposed between said first and second members.

12. A light coupler in accordance with claim 11 wherein said first and second sheets are secured together in a side-by-side manner so that they lie in a single plane.

13. A light coupler in accordance with claim 11 wherein said second rod is tapered, the first endface of said second rod being larger than the second endface thereof.

14. A light coupler in accordance with claim 11 wherein said rods are provided with a layer of transparent cladding material disposed on the surface thereof, the refractive index of said cladding material being lower than that of said rods.

15. A light coupler in accordance with claim 11 wherein the refractive index of said first prism is equal to that of second prism.

16. A light coupler in accordance with claim 11 wherein said prisms are 45° right prisms.

17. A light coupler in accordance with claim 11 further comprising means for connecting the second endfaces of said first, second and third rods to optical signal transmission lines and means for connecting the small end-face of said tapered rod to an optical signal transmission line.

18. A light coupler in accordance with claim 11 wherein said layer is air.

* * * * *